United States Patent Office 3,828,057
Patented Aug. 6, 1974

3,828,057
AMINO DERIVATIVES OF PYRAZOLOPYRIDINE KETONES
Theodor Denzel, Nurnberg, and Hans Hoehn, Tegernheim, Germany, assignors to E. R. Squibb & Sons, Inc., Princeton, N.J.
No Drawing. Continuation-in-part of abandoned application Ser. No. 146,812, May 25, 1971. This application Sept. 26, 1972, Ser. No. 292,363
Int. Cl. C07d 31/42
U.S. Cl. 260—296 H                10 Claims

ABSTRACT OF THE DISCLOSURE

New amino derivatives of pyrazolo[3,4-b]pyridine-5-ketones as well as their salts are useful as central nervous system depressants. These compounds also increase the intracellular concentration of adenosine-3′,5′-cyclic monophosphate.

---

This application is a continuation-in-part of application Ser. No. 146,812, filed May 25, 1971, now abandoned.

SUMMARY OF THE INVENTION

This invention relates to new amino derivatives of pyrazolo[3,4-b]pyridine-5-ketones and salts. These new compounds have the formula (I)
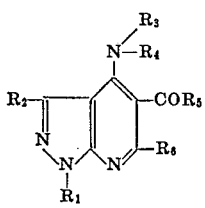

The symbols have the following meanings in formula I and throughout this specification. $R_1$ is hydrogen, lower alkyl, phenyl or phenyl-lower alkylene, benzoyl or substituted benozyl. $R_2$ is hydrogen or lower alkyl. The basic nitrogen group

is an acyclic amino moiety wherein $R_3$ and $R_4$ each is hydrogen, lower alkyl, lower alkanoyl, cyclo-lower alkyl, halo-lower alkanoyl, phenyl, substituted phenyl, phenyl-lower alkylene, amino-lower alkylene or di-lower alkyl-amino-lower alkylene (except for lower alkyl, there is preferably only one of these substituent groups). The substituted benzoyl and substituted phenyl groups are those wherein the phenyl ring contains one or two simple substituents, i.e., a halogen, preferably chlorine, nitro, lower alkoxy, preferably methoxy or trifluoromethyl.

The basic groups may also form a heterocycle of 3,5- or 6-members in which an additional nitrogen is present, i.e., the aziridinyl, pyrrolidino, piperidino, pyrazolyl, pyrimidinyl, pyridazinyl or piperazinyl radicals each of which may also bear as a substituent a hydroxy-lower alkyl group or one or two lower alkyl groups.

$R_5$ is alkyl of up to 10 carbon atoms, lower alkyl (of up to 8 carbons) being preferred, cycloalkyl, phenyl or substituted phenyl (as defined above).

$R_6$ is hydrogen or lower alkyl.

DETAILED DESCRIPTION OF THE INVENTION

The lower alkyl and lower alkylene groups in any of the foregoing radicals are straight or branched chain hydrocarbon groups of up to eight carbon atoms like methyl, ethyl, propyl, isopropyl, butyl, t-butyl and the like. The lowest four members are preferred. The alkyl groups represented by $R_5$ are similar although the straight chain members of the longer chains are preferred. Benzyl and phenethyl are the preferred phenyl-lower alkylene groups. All four halogens are included, but chlorine is preferred.

The lower alkanoyl groups includes the acyl radicals of the lower fatty acids having up ot eight carbon atoms. The lowest four members are preferred.

The cycloalkyl groups are the three to seven carbon alicyclics cyclopropyl, cyclobutyl, cyclopentyl, cyclohexyl and cycloheptyl of which the 5- and 6-membered rings are preferred.

The basic nitrogen group

is an acyclic amino group wherein $R_3$ and $R_4$ each is hydrogen, lower alkyl, phenyl, substituted phenyl (i.e., the phenyl ring contains one or two simple substituents including halogen or trifluoromethyl), phenyl-lower alkylene or di-loweralkylamino-lower alkylene (preferably there is only one of these substituents other than lower alkyl). This basic group may also form a heterocycle of 3-, 5- or 6-members in which an additional nitrogen is present, in particular, aziridinyl, pyrrolidino, piperidino, pyrazolyl, pyrimidinyl, pyridazinyl or piperazinyl radicals, each of which may also bear as a substituent a hydroxy-lower alkyl group or one or two lower alkyl groups. That is to say, $R_3$ and $R_4$ each is hydrogen, lower alkyl, $R_7$, $R_8$-phenyl (wherein $R_7$ and $R_8$ each is hydrogen, halogen or trifluoromethyl), amino-lower alkylene, phenyl-lower alkylene, or di-lower alkylamino-lower alkylene or $R_3$ and $R_4$ together with the nitrogen to which they are attached form one of the heterocyclics mentioned above or the $R_9$-mono-substituted or $R_9$, $R_{10}$-disubstituted derivative (wherein $R_9$ and $R_{10}$ are the substituents lower alkyl or hydroxy-lower alkyl in addition to hydrogen).

The products of the examples are representative of the various compounds of this invention. Preferably $R_4$ is hydrogen, particularly when $R_3$ includes a cyclic substituent or a substituted or unsubstituted acyclic group. Especially preferred compounds of formula I are those wherein $R_1$ is ethyl, $R_2$ is hydrogen or methyl, $R_3$ is butyl, phenyl, substituted phenyl and tertiary amino, $R_4$ is hydrogen, $R_5$ is methyl or phenyl and $R_6$ is hydrogen or methyl.

The new compounds of formula I are formed by the following series of reactions. The symbols in the structural formulas have the same meaning as previously described.

A 5-aminopyrazole of the formula (II)
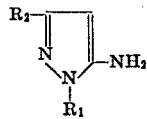

[produced analogous to the procedure described in Z.f. Chemie 10, 386 (1970)], is made to react with an alkoxymethylene acetoacetic acid ester of the formula (III)
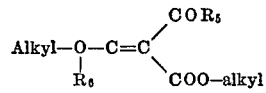

by heating at a temperature of about 120–130° C.

The resulting compound of the formula (IV)
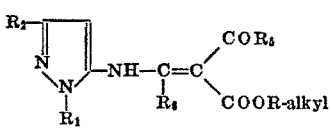

is cyclized in an inert organic solvent such as diphenyl ether at about 230° to about 260° C. while distilling off the alcohol formed, producing a compound of the formula (V)
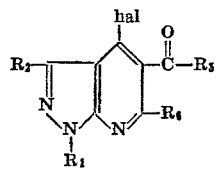

This 4-hydroxy compound is refluxed for several hours with a phosphorus halide like phosphorus oxychloride to obtain the intermediate of the formula (VI)
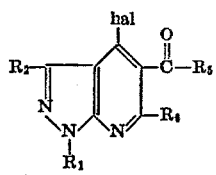

"Hal" represents halogen, preferably chlorine.

The products of formula I are then prepared from compounds of formula VI by reaction with the appropriate primary or secondary amine of the formula

This reaction is effected by treating the reactants either at room or elevated temperatures. In some cases it may be advantageous to make use of an autoclave.

The compound of formula V may alternatively be treated with an alkylating agent, e.g., an alkyl halide like ethyl iodide, to form an intermediate of the formula (VIII)
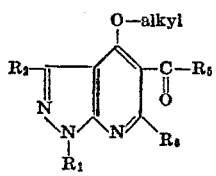

The intermediate of formula VIII may then be treated with the amine as described above to obtain the same products.

According to a modification of the foregoing procedure, a product of formula VIII may be produced by an alternative route.

An alkoxymethylene malonic acid ester of the formula (IIIa)
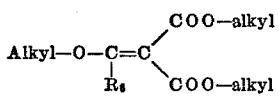

is made to react with an aminopyrazole of formula II, resulting in a compound of the formula (IVa)
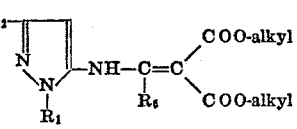

This material is processed as described above, i.e., cyclizing this product to obtain a compound corresponding to formula V but having an ester group in position 5. This in turn by alkylating provides a compound of the formula (IX)
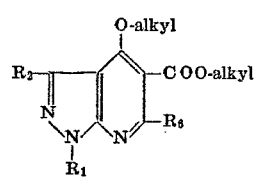

Saponification of the product of formula IX, e.g., with a conventional base, for example an alkali-metal hydroxide, like potassium hydroxide or sodium hydroxide, produces a compound of the formula (X)
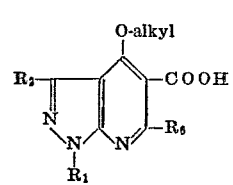

This acid is transformed to a product of the formula (XI)
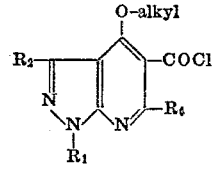

by treatment with an inorganic acid chloride like thionyl chloride.

Compounds of formula VIII are now produced by reacting the compound of formula XI with a metallo-organic compound, like cadmium alkyl, or aryls.

According to another modification of the foregoing procedure a product of formula I wherein $R_1$ is hydrogen may be produced. By this modification, a 5-aminopyrazole of formula II, wherein $R_1$ is an arylmethyl group, or a heteromethyl group is used. This starting material has the formula (IIa)

wherein $R_{11}$ is an aromatic or heterocyclic nucleus like phenyl, furyl, pyridyl, pyrimidyl, pyrazinyl or the like.

This material is processed as described above through the reaction with the alkoxymethylene acetoacetic acid ester of formula III, cyclization of the product corresponding to formula IV to obtain a compound of formula V with a hydroxy group in the 4-position, which in turn by alkylation provides a compound of the formula (VIIIa)

At this point, the compound of formula VIIIa is oxidized with an oxidizing agent like selenium dioxide in a high boiling solvent like diethyleneglycol dimethyl ether at about 160° C. This yields a compound of the formula (XII)
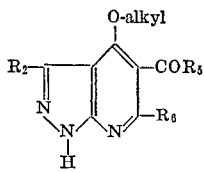

and this product may be treated with the amine as described above.

The compounds of formula I form salts which are also part of this invention. The salts include acid-addition salts, particularly the non-toxic, physiologically acceptable members. The base of formula I form salts by reaction with a variety of inorganic and organic acids providing acid addition salts including, for example, the hydrohalides (especially the hydrochloride), sulfate, nitrate, phosphate, oxalate, tartrate, malate, citrate, acetate, ascorbate, succinate, benzenesulfonate, toluenesulfonate, cyclohexanesulfonate, cyclohexanesulfamate, etc. The acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of formula I. Other salts may then be formed from the free base by reaction with an equivalent of acid.

The new compounds of this invention are central nervous system depressants and may be used as tranquilizers or ataractic agents for the relief of anxiety and tension states, for example, in mice, cats, rats, dogs and other mammalian species, in the same manner as chlordiazepoxide. For this purpose a compound or mixture of compounds of formula I, or non-toxic, physiologically acceptable acid addition salt thereof, may be administered orally or parenterally in a conventional dosage form such as tablet, capsule, injectable or the like. A single dose, or preferably 2 to 4 divided doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds also increase the intracellular concentration of adenosine-3',5'-cyclic monophosphate, and thus by the administration of about 1 to 100 mg./kg./day, preferably about 10 to 50 mg./kg. in single or two to four divided doses in conventional oral or parenteral dosage forms such as those described above may be used to alleviate the symptoms of asthma. In addition some members display anti-inflammatory and diuretic activity as shown in conventional animal tests. In general when $R_5$ is alkyl there is pronounced CNS depression; when $R_5$ is phenyl the anti-inflammatory and diuretic activity are the predominant activity.

The following examples are illustrative of the invention All temperatures are on the centigrade scale.

EXAMPLE 1

5-Acetyl-4-n-butylamino-1-ethyl-1H-pyrazolo[3,4-b]pyridine (a) (1 - Ethyl-5-pyrazolyl)aminomethyleneacetoacetic ethyl ester.—22 g. of 1-ethyl-5-aminopyrazole (2 mol.) and 372 g. of ethoxymethyleneacetoacetic acid ethyl ester (2 mol.) are heated together at 120–130° with stirring, until the theoretical amount of alcohol is distilled off. Cooling and recrystallization from methanol yields 375 g. of (1-ethyl-5-pyrazolyl)aminomethyleneacetoacetic acid ethyl ester (74%) m.p. 53–55°.

(b) 5 - Acetyl - 1 - ethyl - 4 - hydroxy - 1H - pyrazolo-[3,4-b]pyridine.—300 g. of (1-ethyl-5-pyrazolyl)aminomethyleneacetoacetic acid ethyl ester (1.2 mol.) are placed into a flask which is heated in an oil bath for 5 minutes at 260°, while the alcohol formed is distilled off. After this time, the flask is cooled as rapidly as possible. The residue is recrystallized from methanol and yields 148 g. of 5-acetyl-1-ethyl-4-hydroxy-1H-pyrazolo[3,4-b] pyridine (60%) m.p. 155–157°.

(c) 5 - Acetyl - 4 - ethoxy - 1 - ethyl - 1H - pyrazolo-[3,4-b]pyridine.—102 g. of 5-acetyl-1-ethyl-4-hydroxy-1H-pyrazolo[3,4-b]pyridine (0.5 mol.) are dissolved in 500 ml. of dimethylformamide. 100 g. of potassium carbonate (0.71 mol.) and 117 g. of ethyl iodide (0.75 mol.) are added. The mixture is heated for 10 hours with continuous stirring at 60–70°. The precipitate is filtered off and the liquid phase evaporated to about 100 ml. After addition of 500 ml. of water, 5-acetyl-4-ethoxy-1-ethyl-1H-pyrazolo[3,4-b]pyridine precipitates and yields on filtration 92 g. (73%) m.p. 136°.

(d) 5 - Acetyl - 4 - butylamino - 1 - ethyl - 1H - pyrazolo[3,4-b]pyridine.—2.5 g. of 5-acetyl-4-ethoxy-1-ethyl-1H-pyrazolo[3,4-b]pyridine (0.01 mol.) and 2.2 g. (0.03 mol.) of n-butylamine in 15 ml. of ethanol are refluxed for 5 hours. After this time, 50 ml. of water are added and the white precipitate is filtered off. Recrystallization from ligroin yields 2.3 g. of 5-acetyl-4-butylamino-1-ethyl-1H-pyrazolo[3,4-b]pyridine (88%), m.p. 73°.

The hydrochloride salt is produced by treating the above product with dilute ethanolic hydrogen chloride solution.

EXAMPLE 2

4-Anilino-5-benzoyl-1-ethyl-1H-pyrazolo[3,4-b]pyridine (a) 5 - Benzoyl - 1 - ethyl - 4 - hydroxy - 1H - pyrazolo-[3,4-b]pyridine.—222 g. of 5-amino-1-ethylpyrazole (2 mol.) and 496 g. of ethoxymethylenebenzoylacetic acid ethyl ester (2 mol.) are heated under stirring to about 140°, until no more alcohol distills. The temperature is then raised to 240°. The alcohol formed is distilled off in vacuo. After about one hour, the reaction is finished, the residue is cooled to room temperature and 500 ml. of methanol are added. 5-Benzoyl-1-ethyl-4-hydroxy-1H-pyrazolo[3,4-b]pyridine crystallizes and is filtered off. Yield 360 g. (67%) m.p. 151°.

(b) 5 - Benzoyl - 4 - chloro - 1 - ethyl - 1H - pyrazolo-[3,4-b]pyridine.—53.5 g. (0.2 mol.) of 5-benzoyl-1-ethyl-4-hydroxy-1H-pyrazolo[3,4-b]pyridine and 150 ml. of phosphorus oxychloride are refluxed at 150° for 5 hours. The excess phosphorus halide is removed in vacuo and the residue is neutralized with saturated sodium bicarbonate solution. The pale yellow crystals of 5-benzoyl-4-chloro-1-ethyl-1H-pyrazolo[3,4-b]pyridine are filtered off and recrystallized from ethyl acetate, yield 35 g. (61%) m.p. 140°.

(c) O - Anilino - 5 - benzoyl - 1 - ethyl - 1H - pyrazolo-[3,4-b]pyridine.—2.85 g. (0.01 mol.) of 5-benzoyl-4-chloro-1-ethyl-1H-pyrazolo[3,4-b]pyridine and 2 g. (0.021 mol.) of aniline are suspended in 20 ml. of butanol and heated for 5 hours at 130°. The solvent is distilled off and the residue is treated with 10 ml. of water. 4-Anilino-5-benzoyl-1-ethyl-1H-pyrazolo[3,4-b]pyridine crystallizes on cooling. Yield 2.5 g. (73%) m.p. 137–138°.

EXAMPLE 3

5-Benzoyl-4-(chloroacetylamino)-1-ethyl-1H-pyrazolo[3,4-b]pyridine (a) 4 - Amino - 5 - benzoyl - 1 - ethyl - 1H - pyrazolo-[3,4-b]pyridine.—28.5 g. (0.1 mol.) of 5-benzoyl-4-chloro-1-ethyl-1H-pyrazolo[3,4-b]pyridine are dissolved in 100 ml. of butanol and treated with 50 ml. of concentrated aqueous ammonia solution at 150° for 5 hours in an autoclave. The solvent is removed and the residue is washed with 100 ml. of water. Recrystallization from a methanol-water mixture yields 15 g. of 4-amino-5-benzoyl-1-ethyl-1H-pyrazolo[3,4-b]pyridine (56%) m.p. 152–153°.

(b) 5 - Benzoyl - 4 - (chloroacetylamino) - 1 - ethyl-1H-pyrazolo[3,4-b]pyridine.—2.66 g. (0.01 mol.) of 4-amino-5-benzoyl-1-ethyl-1H - pyrazolo[3,4-b]pyridine are dissolved in 50 ml. of dry dimethyleneglycol dimethyl ether. 0.31 g. (0.013 mol.) of sodium hydride are added and the mixture is stirred for 30 minutes. The yellow suspension is then cooled to −50°. At this temperature 1.12 g. (0.01 mol.) of chloroacetyl chloride are dropped in. Stirring is continued for 1 hour. The mixture is warmed to 0° and 100 ml. of water are added. 5-Benzoyl-4-(chloroacetylamino)-1-ethyl-1H-pyrazolo[3,4-b]pyridine crystallizes and is filtered off. Yield 1.9 g. (55%) m.p. 135°.

EXAMPLE 4

By treating the product of Example 1(b) with phosphorus oxychloride according to the procedure of Example 2, 5-acetyl-4-chloro-1-ethyl-1H-pyrazolo[3,4-b]pyridine is obtained, m.p. 55°.

EXAMPLE 5

4-Amino-5-benzoyl-1-(4-chlorobenzoyl)-1H-pyrazolo[3,4-b]pyridine (a) [[[1-(2-furyl)methylpyrazolyl]amino]methylene]benzoylacetic acid ethyl ester.—163 g. of 1-(2-furyl)methyl-5-aminopyrazole (1 mol.) and 248 g. of ethoxymethylene benzoyl acetic acid ethyl ester (1 mol.) are heated at 130° until no more alcohol distils off (approximately 1 hour). The oily residue crystallizes and yields on cooling and recrystallization from hexane 310 g. of [[[1-(2-furyl)methyl - 5 - pyrazolyl]amino]methylene]benzoylacetic acid ethyl ester (85%), 75–77°.

(b) 5-benzoyl-4-hydroxy-1-(2 - furyl)methyl-1H-pyrazolo[3,4-b]pyridine.—36.5 g. of [[[1-(2-furyl)methyl-5-pyrazolyl]amino]-methylene]benzoyl acetic acid ethyl ester are dissolved in 50 ml. of diphenyl ether and refluxed at 260° for 30 minutes. Distillation of the solvent yields a dark oil, which crystallizes on addition of methanol. Recrystallization yields 20 g. of 5-benzoyl-4-hydroxy-1-(2-furyl)methyl - 1H - pyrazolo[3,4-b]pyridine (61%), m.p. 102°.

(c) 5-benzoyl - 4 - ethoxy-1-(2-furyl)methyl-1H-pyrazolo[3,4-b]pyridine.—3.3 g. of 5-benzoyl-4-hydroxy-1-(2-furyl)methyl-1H-pyrazolo[3,4-b]pyridine (0.01 mol.) are dissolved in 20 ml. of dimethylformamide. 2.8 g. of potassium carbonate and 3.1 g. of ethyl iodide are added and the mixture is warmed for 12 hours at 60°. Excess potassium carbonate is filtered off and water is added. 5 - Benzoyl-4-ethoxy-1-(2-furyl)methyl-1H-pyrazolo[3,4-b]pyridine precipitates and is recrystallized from hexane, yield 3 g. (86%), m.p. 70°.

(d) 5-Benzoyl-4-ethoxy-1H-pyrazolo[3,4-b]pyridine.—1.7 g. of 5-benzoyl-4-ethoxy-1-(2-furyl)methyl-1H-pyrazolo[3,4-b]pyridine (0.005 mol.) are dissolved in 5 ml. of diethyleneglycol dimethyl ether, 1.1 g. of selenium dioxide are added and the mixture is heated with stirring at 160°. After the addition of one drop of water, the temperature is maintained for 1 hour. The mixture is filtered hot and 5-benzoyl-4-ethoxy-1H-pyrazolo[3,4-b]pyridine precipitates on cooling. Recrystallization from butanol yields 1 g. (77%), m.p. 195–197°.

(e) 4-Amino-5-benzoyl-1H-pyrazolo[3,4-b]pyridine.—2.6 g. 5-benzoyl - 4 - ethoxy-1H-pyrazolo[3,4-b]pyridine (0.01 mol.) are dissolved in 50 ml. of n-butyl alcohol, 10 ml. of aqueous ammonia (32%) are added and the mixture is heated for 10 hours in an autoclave at 160°. After this period, the excess solvent is removed in vacuo and the residue is recrystallized from n-butyl alcohol, yielding 2.1 g. of 4-amino-5-benzoyl-1H-pyrazolo[3,4-b]pyridine (83%), m.p. 282–283°.

(f) 4 - Amino-5-benzoyl-1-(4-chlorobenzoyl)-1H-pyrazolo[3,4-b]pyridine.—2.0 g. of 4-amino-5-benzoyl-1H-pyrazolo[3,4-b]pyridine (0.083 mol.) are dissolved in 50 ml. of anhydrous pyridine and 2 g. p-chlorobenzoyl chloride are dropped in with continuous stirring. Stirring is continued at room temperature for 24 hours. Then the reaction mixture is poured onto 100 g. of crushed ice and the precipitated 4-amino-5-benzoyl-1-(4-chlorobenzoyl)-1H-pyrazolo[3,4-b]pyridine is filtered off. Recrystallization from dimethylformamide yields 2.6 (69%), m.p. 262–265°.

EXAMPLE 6

4-Butylamino-5-undecanoyl-1-ethyl-1H-pyrazolo[3,4-b]pyridine (a) [[(1-Ethyl-5-pyrazolyl)amino]methylene]malonic acid diethyl ester.—245 g. of 1-ethyl-5-aminopyrazole (2.2 mol.) and 476 g. of ethoxymethylene malonic acid diethyl ester (2.2 mol.) are heated to 120° (bath temperature) for 2 hours with stirring. The ethanol formed by this reaction is removed in vacuo. Then vacuum distillation (b.p.$_{01}$ 154–160°) yields 520 g. (84%) of a quickly crystallizing oil, [[(1-ethyl-5-pyrazolyl)amino]methylene]malonic acid diethyl ester, m.p. 50–53°. The compound is recrystallized from N-hexane, m.p. 55–57°.

(b) 1 - Ethyl-4-hydroxy-1H-pyrazolo[3,4-b]pyridine-5-carboxylic acid ethyl ester.— 253 g. of [[(1-ethyl-5-pyrazolyl)amino]methylene]malonic acid diethyl ester (0.09 mol.) are dissolved in 770 g. of diphenyl ether. The reaction mixture is heated to 235–250° (bath temperature) and allowed to react at this temperature for 1–2 hours while the resulting ethanol is continuously distilled off. The last amount of alcohol is removed by means of a water aspirator. The diphenyl ether is separated by distillation with a fractionating column in vacuo. The 1 - ethyl-4-hydroxy-1H-pyrazolo[3,4-b]pyridine-5-carboxylic acid ethyl ester is obtained at b.p.$_{0.05}$ 115–120°, yield 195 g.=92%, m.p. 85–87°. The compound is recrystallized from benzene (90–100°), m.p. 87–89°.

(c) 4-Ethoxy - 1 - ethyl-1H-pyrazolo[3,4-b]pyridine-5-carboxylic acid ethyl ester.—In a solution of 259 g. (1.1 mol.) of 1-ethyl-4-hydroxy-1H-pyrazolo[3,4-b]pyridine-5-carboxylic acid ethyl ester in 1700 ml. of dimethyl formamide, 400 g. of well pulverized potassium carbonate and 300 g. of ethyl iodide are introduced. The reaction mixture is stirred for 7 hours at 65° and filtered under suction, while hot, from excess potassium carbonate. Upon standing overnight, 165 g. of 4-ethoxy-1-ethyl-1H-pyrazolo[3,4-b]pyridine-5-carboxylic acid ethyl ester crystallize out of the solution, m.p. 112–115°. After evaporation of the mother liquor, an additional 80 g. are obtained. The total yield amounts to 85% of theory. The compound is recrystallized from benzene (90–100°), m.p. 113–115°.

(d) 4-Ethoxy - 1 - ethyl-1H-pyrazolo[3,4-b]pyridine-5-carboxylic acid.—263 g. of 4-ethoxy-1-ethyl-1H-pyrazolo[3,4-b]pyridine-5-carboxylic acid ethyl ester (1 mol.) are heated with a solution of 114 g. of potassium hydroxide (2 mol.) in 1 liter of ethanol at 60° for 12 hours. After this time the solvent is removed in vacuo and the residue is dissolved in 1.5 liter of water. After acidifying with acetic acid, 4-ethoxy-1-ethyl-1H-pyrazolo[3,4-b]pyridine-5-carboxylic acid precipitates. Recrystallization from alcohol yields 215 g. (91%), m.p. 198–199°.

(e) 4-Ethoxy - 1 - ethyl-1H-pyrazolo[3,4-b]pyridine-5-carboxylic acid chloride.—117.5 g. of 4-ethoxy-1-ethyl-1H-pyrazolo[3,4-b]pyridine-5-carboxylic acid (0.5 mol.) are slowly added with stirring to 300 ml. of thionyl chloride. The mixture is refluxed for 4 hours, excess thionyl chloride is removed in vacuo and the residue dissolved in 500 ml. of anhydrous diethyl ether. The undissolved material is filtered off and the filtrate intensively cooled. The acid chloride precipitates; it is filtered under suction and washed well with cold water. Yield 105 g. (80%), m.p. 72–73°.

(f) 4-Ethoxy-1-ethyl-5-undecanoyl-1H-pyrazolo[3,4-b]pyridine.—From a solution of 3.3 g. of decyl bromide (0.015 mol.) and 0.36 g. magnesium in 50 ml. anhydrous ether, the Grignard reagent is prepared in the usual manner. To this reagent 2 g. of anhydrous cadmium chloride are added and the mixture is stirred for half an hour. After this time, the solvent is removed by distillation and 50 ml. of anhydrous benzene are added to the residue. Once more 20 ml. of the solvent are distilled off. The remaining solution is treated carefully with 1.26 g. of acid chloride from part e. The mixture is heated for 3 hours with stirring under reflux. After this time, the solution is made acidic with acetic acid and 10 ml. of water are added. The organic layer is separated and the aqueous phase extracted 3 times with 10 ml. portions of ether. The collected organic layers are dried over sodium sulfate, filtered, and the solvent distilled off. The oily residue crystallizes on addition of about 5 ml. of ether. The 4-ethoxy-1-ethyl-5-undecanoyl-1H-pyrazolo[3,4-b]pyridine is filtered under suction and recrystallized from petroleum ether, yield 2.2 g. (61%), m.p. 48–49°.

(g) 4-Butylamino-1-ethyl-5-undecanoyl-1H-pyrazolo-[3,4-b]pyridine.—1.8 g. of 4-ethoxy-1-ethyl-5-undecanoyl-1H-pyrazolo[3,4-b]pyridine (0.005 mol.) are refluxed with 10 ml. n-butylamine for 10 hours. After this time, the excess of amine is removed in vacuo and the residue treated with 10 ml. water. 4 - Butylamino - 1 - ethyl - 5 - undecanoyl-1H-pyrazolo[3,4-b]pyridine precipitates and is filtered under suction. Recrystallization from petroleum ether yields 1.7 g. (87%), m.p. 57–58°.

The following additional products are obtained by the procedure of Example 1 by substituting for the n-butylamine the amine shown below:

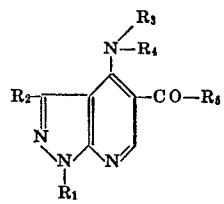

| Example | Amine | $R_1$ | $R_2$ | $-N\genfrac{}{}{0pt}{}{R_3}{R_4}$ | $R_5$ | M.P. (deg.) |
|---|---|---|---|---|---|---|
| 7 | $H_2N-CH\genfrac{}{}{0pt}{}{CH_3}{C_2H_5}$ | $-C_2H_5$ | H | $-NH-CH\genfrac{}{}{0pt}{}{CH_3}{C_2H_5}$ | $CH_3$ | 66–68 |
| 8 | $H_2N-\phi$ | $-C_2H_5$ | H | $-N(H)-\phi$ | $CH_3$ | 73–74 |
| 9 | $H_2N-\phi-NH_2$ | $-C_2H_5$ | H | $-N(H)-\phi-NH_2$ | $CH_3$ | 198–200 |

The following additional compounds are produced by the procedure of Example 2 by substituting for the aniline in part c the amine indicated below:

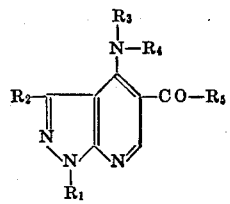

| Example | Amine | $R_1$ | $R_2$ | $-R\genfrac{}{}{0pt}{}{R_3}{R_4}$ | $R_5$ | M.P (deg.) |
|---|---|---|---|---|---|---|
| 10 | $H_2NC_4H_9$ | $-C_2H_5$ | H | $-NC_4H_9$ with H | $\phi$ | 155–156 |
| 11 | $H_2N-CH\genfrac{}{}{0pt}{}{CH_3}{C_2H_5}$ | $-C_2H_5$ | H | $-N(H)-CH\genfrac{}{}{0pt}{}{CH_3}{C_2H_5}$ | $\phi$ | 87–88 |
| 12 | $H_2N-\phi$ | $-C_2H_5$ | H | $-N(H)-\phi$ | $\phi$ | 137–138 |
| 13 | $H_2N(CH_2)_3N(CH_3)_2$ | $-C_2H_5$ | H | $HN-CH_2-CH_2-CH_2-N\genfrac{}{}{0pt}{}{CH_3}{CH_3}$ | $\phi$ | 79–82 |
| 14 | $H_2N-\phi-NH_2$ | $-C_2H_5$ | H | $-N(H)-\phi-NH_2$ | $\phi$ | 155–158 |

TABLE—Continued

| Example | Amine | $R_1$ | $R_2$ | $-N\begin{smallmatrix}R_3\\R_4\end{smallmatrix}$ | $R_5$ | M.P. (deg.) |
|---|---|---|---|---|---|---|
| 15 | $H_2N-\langle\bigcirc\rangle-OCH_3$ (NO$_2$) | $-C_2H_5$ | H | $-NH-\langle\bigcirc\rangle-OCH_3$ (NO$_2$) | phenyl | 152–155 |
| 16 | $H_2N-\langle\bigcirc\rangle-Cl$ (NO$_2$) | $-C_2H_5$ | H | $-NH-\langle\bigcirc\rangle-Cl$ (NO$_2$) | phenyl | 184–186 |
| 17 | $H_2N(CH_2)_2NH_2$ | $-C_2H_5$ | H | $-NHCH_2-CH_2-NH_2$ | phenyl | 110–113 |

The following products are obtained by the procedure of Example 3:

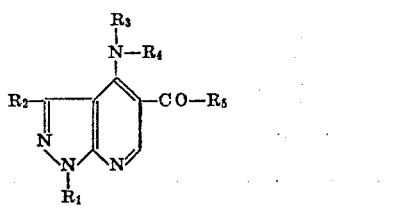

| Example | $R_1$ | $R_2$ | $-N\begin{smallmatrix}R_3\\R_4\end{smallmatrix}$ | $R_5$ | M.P. (deg.) |
|---|---|---|---|---|---|
| 18 | $-C_2H_5$ | H | $-NH-COCH_3$ | $CH_3$ | 140–141 |
| 19 | $-C_2H_5$ | H | $-NH-COCH_3$ | phenyl | 110–113 |

The following products are obtained by the procedure of Example 5 by substituting for the ammonia in part e the amine indicated below or by utilizing a substituted starting material:

The following products are obtained by the procedure of Example 6 by substituting for the decyl bromide in part f the $R_5$-Br having the $R_5$ indicated below and substituting for the n-butylamine in part g the amine $$H_2N\begin{smallmatrix}R_3\\R_4\end{smallmatrix}$$

having the $$-N\begin{smallmatrix}R_3\\R_4\end{smallmatrix}$$

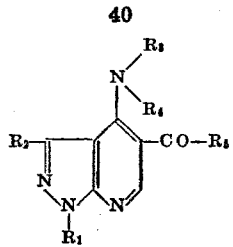

| Example | Amine | $R_1$ | $R_2$ | $-N\begin{smallmatrix}R_3\\R_4\end{smallmatrix}$ | $R_5$ | M.P. (deg.) |
|---|---|---|---|---|---|---|
| 20 | $H_2NCH(CH_3)_2$ | H | H | $-NH-CH(CH_3)_2$ | phenyl | 174–175 |
| 21 | $H_2NCH(CH_3)(C_2H_5)$ | $-CO-\langle\bigcirc\rangle-Cl$ | H | $-NH-CH(CH_3)(C_2H_5)$ | phenyl | 129–131 |
| 22 | $H_2NCH(CH_3)(C_2H_5)$ | H | $CH_3$ | $-NH-CH(CH_3)(C_2H_5)$ | phenyl | 198–199 |
| 23 | $NH_3$ | H | $CH_3$ | $-NH_2$ | phenyl | 313–315 |
| 24 | $NH_3$ | H | H | $-NH_2$ | $-\langle\bigcirc\rangle-Cl$ | 250–253 |
| 25 | $H_2N-CH(CH_3)(C_2H_5)$ | H | H | $-NH-CH(CH_3)(C_2H_5)$ | $-\langle\bigcirc\rangle-Cl$ | 216–218 | group indicated below:

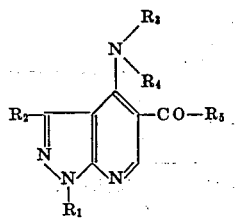

| Example | $R_1$ | $R_2$ | $-N\genfrac{}{}{0pt}{}{R_3}{R_4}$ | $R_5$ | M.P. (deg.) |
|---|---|---|---|---|---|
| 26 | $-C_2H_5$ | H | $-N(H)-C_4H_9$ | $-C_2H_5$ | 59-60 |
| 27 | $-C_2H_5$ | H | $-N(H)-C_4H_9$ | $-C_4H_9$ | 37-39 |
| 28 | $-C_2H_5$ | H | $-N(H)-C_4H_9$ | $-C_3H_7$ | 58-59 |
| 29 | $-C_2H_5$ | H | $-N(H)-CH(CH_3)(C_2H_5)$ | $-C_3H_7$ | (1) |
| 30 | $-C_2H_5$ | H | $-N(H)-CH(CH_3)(C_2H_5)$ | $-C_4H_9$ | 44-45 |

TABLE—Continued

| Example | $R_1$ | $R_2$ | $-N\genfrac{}{}{0pt}{}{R_3}{R_4}$ | $R_5$ | M.P. (deg.) |
|---|---|---|---|---|---|
| 31 | $-C_2H_5$ | H | $-N(H)-CH(CH_3)(C_2H_5)$ | $-C_2H_5$ | 109-110 |
| 32 | $-C_2H_5$ | H | $-N(H)-CH(CH_3)(C_2H_5)$ | $-C_{10}H_{21}$ | (2) |

[1] B.P. 165-170°/0.3.    [2] B.P. 215°/0.3.

The following products are obtained by the procedure of Example 2 by substituting for the 5-amino-1-ethylpyrazole in part a the 1-$R_1$, 3-$R_2$-5-aminopyrazole having the $R_1$ and $R_2$ substituents indicated below and substituting in that part for the ethoxymethylenebenzoylacetic acid ester the ester of formula III having the $R_5$ and $R_6$ substituents indicated below, then in part c substituting for the aniline the amine

having the $R_3$ and $R_4$ substituents indicated below:

| Example | $R_1$ | $R_2$ | $R_5$ | $R_6$ | $-N\genfrac{}{}{0pt}{}{R_3}{R_4}$ |
|---|---|---|---|---|---|
| 33 | $C_6H_5CH_2-$ | H | $C_2H_5$ | H | $-NH_2$ |
| 34 | $C_6H_5$ | $C_2H_5$ | $C_2H_5$ | H | $-N(C_2H_5)(C_2H_5)$ |
| 35 | n-$C_3H_7$ | $CH_3$ | n-$C_3H_7$ | H | $-N(CH_3)(CH_3)$ |
| 36 | $C_2H_5$ | H | n-$C_4H_9$ | H | $-NHC_4H_9(n)$ |
| 37 | $C_2H_5$ | $CH_3$ | Cyclobutyl | H | $-NHC_4H_9(n)$ |
| 38 | $C_2H_5$ | $CH_3$ | Cyclopentyl | H | $-N(C_5H_{11}(n))(C_5H_{11}(n))$ |
| 39 | $C_2H_5$ | $CH_3$ | Cyclohexyl | H | $-NH-C_6H_5$ |
| 40 | $C_2H_5$ | $CH_3$ | $CH_3$ | H | $-N\triangleleft$ (aziridinyl) |
| 41 | $C_2H_5$ | H | $C_2H_5$ | H | $-N$ (pyrrolidinyl) |
| 42 | $C_2H_5$ | $CH_3$ | $CH_3$ | H | $-N$ (piperidinyl) |
| 43 | $C_2H_5$ | $CH_3$ | $CH_3$ | H | $-N\diagdown NH$ (piperazinyl) |

TABLE—Continued

| Example | $R_1$ | $R_2$ | $R_5$ | $R_6$ | $-N\begin{smallmatrix}R_3\\R_4\end{smallmatrix}$ |
|---|---|---|---|---|---|
| 44 | $C_2H_5$ | $CH_3$ | $CH_3$ | H | -N⟨piperazinyl⟩NH |
| 45 | $C_2H_5$ | $CH_3$ | $CH_3$ | H | -N⟨piperazinyl⟩NC$_2$H$_4$OH |
| 46 | $C_2H_5$ | $CH_3$ | C$_6$H$_5$ | H | $-NH_2$ |
| 47 | $C_6H_5C_2H_4-$ | $CH_3$ | C$_6$H$_4$-Br | H | $-NHC_4H_9$ |
| 48 | $C_2H_5$ | H | C$_6$H$_4$-Cl | H | $-NHCH_3$ |
| 49 | $C_6H_5CH_2$ | $C_2H_5$ | C$_6$H$_4$-Cl | H | -NH-C$_6$H$_3$(Cl)$_2$ |
| 50 | $C_2H_5$ | $C_2H_5$ | C$_6$H$_5$ | H | $-NHCH_3$ |
| 51 | $C_2H_5$ | $C_2H_5$ | C$_6$H$_5$ | H | -NH-C$_6$H$_4$-CF$_3$ |
| 52 | $C_2H_5$ | $C_2H_5$ | $C_2H_5$ | H | $-\underset{H}{N}-C_2H_4N(C_2H_5)_2$ |
| 53 | $CH_3$ | H | $CH_3$ | H | $-NHCH_2CH_2-C_6H_5$ |
| 54 | $C_2H_5$ | H | $CH_3$ | H | $-N(CH_3)_2$ |
| 55 | $CH_3$ | H | $CH_3$ | H | $-N(CH_3)_2$ |
| 56 | $C_2H_5$ | H | $CH_3$ | H | $-NHCOCH_3$ |
| 57 | $C_2H_5$ | H | $CH_3$ | $CH_3$ | $NH_2$ |
| 58 | H | H | C$_6$H$_5$ | $CH_3$ | $NH_2$ |
| 59 | $C_2H_5$ | $CH_3$ | C$_6$H$_4$-Cl | $CH_3$ | $-\underset{H}{N}-C_4H_9$ |
| 60 | H | H | C$_6$H$_4$-OCH$_3$ | $CH_3$ | $-\underset{H}{N}-$cyclohexyl |
| 61 | $-CH_2-C_6H_5$ | $CH_3$ | C$_6$H$_4$-NH$_2$ | $CH_3$ | $-\underset{H}{N}-CH_3$ |
| 62 | $-CH(CH_3)_2$ | H | $CH_3$ | $CH_3$ | $-\underset{H}{N}-C_6H_4-CF_3$ |
| 63 | H | H | C$_6$H$_5$ | $CH_3$ | $-\underset{H}{N}-CH_2CH_2CH_2N(CH_3)_2$ |
| 64 | H | $CH_3$ | C$_6$H$_4$-Cl | $CH_3$ | $-NHCOC_3H_7$ |
| 65 | C$_6$H$_5$ | H | C$_6$H$_5$ | H | $-N(COCH_3)_2$ |
| 66 | $C_2H_5$ | H | $CH_3$ | $CH_3$ | $-N(COC_3H_7)_2$ |
| 67 | H | H | C$_6$H$_5$ | $CH_3$ | -N⟨piperazinyl⟩NH |
| 68 | $CH_3$ | $CH_3$ | $CH_3$ | H | -N⟨piperazinyl⟩N-CH$_3$ |

TABLE—Continued

| Example | $R_1$ | $R_2$ | $R_5$ | $R_6$ | $N{<}^{R_3}_{R_4}$ |
|---|---|---|---|---|---|
| 69 | H | H | –C$_6$H$_4$–OCH$_3$ | CH$_3$ | N-piperidinyl |
| 70 | C$_2$H$_5$ | CH$_3$ | C$_6$H$_5$ | H | 2-methylpiperidinyl |
| 71 | –CH$_2$–C$_6$H$_5$ | H | C$_2$H$_5$ | C$_2$H$_5$ | 3,3-dimethylpyrrolidinyl |
| 72 | H | CH$_3$ | C$_6$H$_5$ | H | –N(CH$_2$CH$_2$OH)– (2-hydroxymethylpyrrolidinyl) |
| 73 | H | H | C$_6$H$_5$ | CH$_3$ | 4-ethylpiperazin-1-yl |
| 74 | C$_2$H$_5$ | CH$_3$ | C$_6$H$_5$ | H | —NHCOCH$_2$CH$_2$Br |
| 75 | H | H | CH$_3$ | CH$_3$ | —N(COCH$_2$Cl)$_2$ |

What is claimed is:

1. A compound of the formula

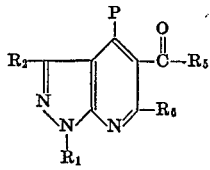

wherein $R_1$ is hydrogen, $C_1$–$C_4$-lower alkyl, phenyl, phenyl-($C_1$–$C_4$-lower alkylene) or benzoyl; $R_2$ and $R_6$ each is hydrogen or $C_1$–$C_4$-lower alkyl; $R_5$ is alkyl up to 10 carbon atoms, $C_4$–$C_6$-cycloalkyl, phenyl, $C_1$–$C_4$-lower alkoxy phenyl or aminophenyl; and P is halogen or hydroxy.

2. A compound as in Claim 1 wherein $R_1$ is ethyl, $R_2$ and $R_6$ each is hydrogen or methyl and $R_5$ is methyl or phenyl.

3. A compound as in Claim 1 wherein $R_1$, $R_2$ and $R_6$ each is hydrogen, $R_5$ is phenyl and P is halogen.

4. A compound as in Claim 3 wherein the halogen is chlorine.

5. A compound as in Claim 1 wherein $R_1$, $R_2$ and $R_6$ each is hydrogen, $R_5$ is phenyl and P is hydroxy.

6. A compound as in Claim 1 wherein $R_1$ and $R_5$ each is $C_1$–$C_4$-lower alkyl, $R_2$ and $R_6$ each is hydrogen and P is hydroxy.

7. A compound as in Claim 6 wherein $R_1$ is ethyl and $R_5$ is methyl.

8. A compound as in Claim 1 wherein $R_1$ is lower alkyl, $R_2$ and $R_6$ each is hydrogen, $R_5$ is phenyl and P is halogen.

9. A compound as in Claim 1 wherein P is chlorine.

10. A compound as in Claim 8 wherein the lower alkyl group is ethyl and the halogen is chlorine.

References Cited
UNITED STATES PATENTS
3,733,328   5/1973   Hoehn et al. _____ 260—293.6

ALAN L. ROTMAN, Primary Examiner

U.S. Cl. X.R.
260—250 A, 268 BC, 256.4 R, 294.8 R, 295 S, 295.5 B, 295 K, 310 R; 424—266

UNITED STATES PATENT AND TRADEMARK OFFICE
CERTIFICATE OF CORRECTION

PATENT NO. : 3,828,057
DATED : August 6, 1974
INVENTOR(S) : Theodor Denzel, Hans Hoehn It is certified that error appears in the above-identified patent and that said Letters Patent are hereby corrected as shown below:

Column 2, line 12 -- ot -- should be "to".  Column 3, formula V 

Column 5, line 72 -- 22 g. -- should be "222 g."
Column 6, line 59 --O-- should be "4".
Column 16, Example 59 under $\begin{array}{c}R_3\\N\\R_4\end{array}$ -- $-\underset{H}{\overset{}{N}}-C_4H$ -- should be " $-\underset{H}{\overset{}{N}}-C_4H_9$ "

Signed and Sealed this

Twenty-eighth Day of September 1976

[SEAL]

Attest:

RUTH C. MASON
*Attesting Officer*

C. MARSHALL DANN
*Commissioner of Patents and Trademarks*